Oct. 23, 1962

J. F. WOOD 3,060,280

ELECTROMECHANICAL TRANSDUCER

Filed March 30, 1959

2 Sheets-Sheet 1

Inventor
John F. Wood
By: Graf, Neuman & Burmeister
Attorneys

Oct. 23, 1962
J. F. WOOD
3,060,280
ELECTROMECHANICAL TRANSDUCER
Filed March 30, 1959
2 Sheets-Sheet 2

Inventor
John F. Wood
By: Greist, Neuman & Burmeister
Attorneys

United States Patent Office 3,060,280

Patented Oct. 23, 1962

3,060,280

ELECTROMECHANICAL TRANSDUCER

John F. Wood, Buchanan, Mich., assignor to Electro-Voice, Incorporated, Buchanan, Mich., a corporation of Indiana Filed Mar. 30, 1959, Ser. No. 802,917

6 Claims. (Cl. 179—100.41)

The present invention relates to electromechanical transducers for simultaneously responding to two forces impressed upon the transducer along orthogonally related axes, and particularly to phonograph pickups for use with stereophonic record discs.

The patent application of Howard M. Durbin and the present inventor entitled "Phonograph Pickup and Turnover Mechanism," Serial No. 736,819, filed May 21, 1958, discloses a phonograph pickup for stereophonic records which employs two elongated parallel piezoelectric elements mounted at one end and carrying a yoke at the other end. The piezoelectric elements are provided with electrodes on opposite sides thereof, and the axes between the electrodes of the two elements are disposed normal to each other. The pickup is provided with a phonograph stylus which is mechanically coupled to the yoke to impress the undulations of one channel on the pickup parallel to the axis between the electrodes of one element, and the undulations of the other record channel parallel to the axis between the electrodes of the other element of the pickup.

At certain frequencies within the response range of a phonograph pickup of this type, the response of each of the elements exhibits an amplitude peak. Further, the frequency of peak response differs in the usual case for the two elements of the pickup. As a result, the isolation between channels at such frequencies is reduced. Further, the frequency response characteristic of the phonograph pickup at these frequencies is undesirable.

Response peaks for each of the piezoelectric elements of such phonograph pickups are generally the result of mechanical resonances introduced because of the fact that the effective length of the piezoelectric element is a half wave length at the frequency of the response peak. At this frequency, the maximum vibrational amplitude of the piezoelectric element occurs in the region approximately midway between the yoke and the means mounting the element to the housing of the phonograph pickup. Monaural phonograph pickups have employed damping members between the element and the casing to reduce such resonances, but such members are undesirable in stereophonic pickups of this type. It has been found that any damping member mounted between a piezoelectric element and the housing reduces the overall compliance of the phonograph pickup, and since the compliance of this type of stereophonic phonograph pickup is reduced from that of a monaural pickup, and stereophonic records require pickups of greater compliance than monaural records, the loss in compliance resulting from such a construction restricts its use.

It is an object of the present invention to provide a piezoelectric transducer and a phonograph pickup which exhibits improved frequency response characteristics.

It is a further object of the present invention to provide an electromechanical transducer and a phonograph pickup which simultaneously responds to two forces exerted along different axes and which exhibits improved isolation between the responses.

These and further objects of the present invention will be apparent from a further reading of this disclosure, particularly when viewed in the light of the drawings, in which.

Figure 1:
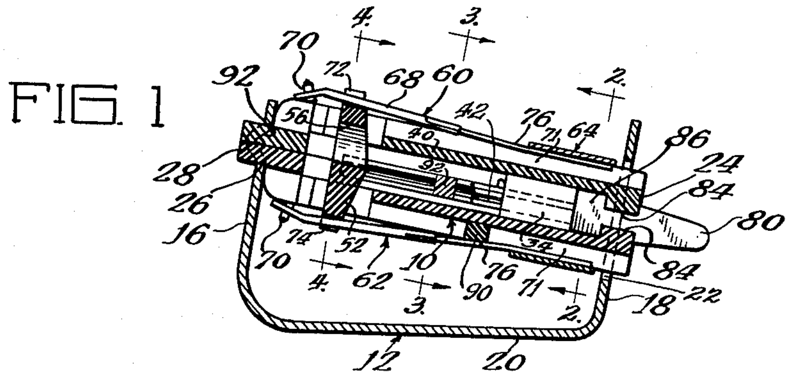
FIGURE 1 is a longitudinal sectional view of a phonograph pickup constructed according to the teachings of the present invention.
Figure 2:
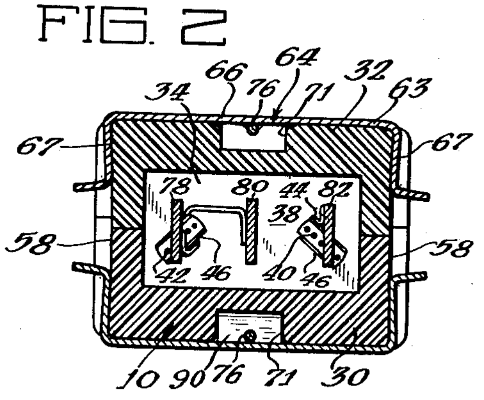
FIGURE 2 is a sectional view of the phonograph pickup taken along the line 2—2 of FIGURE 1.
Figure 3:
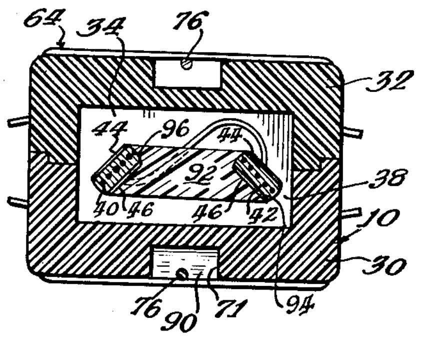
FIGURE 3 is a sectional view of the phonograph pickup taken along the line 3—3 of FIGURE 1.
Figure 4:
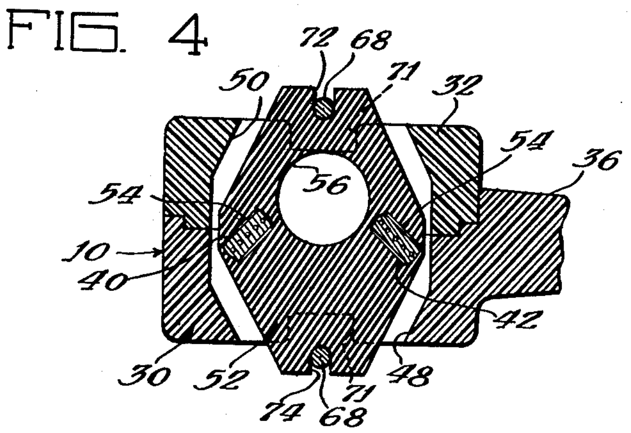
Figure 5:
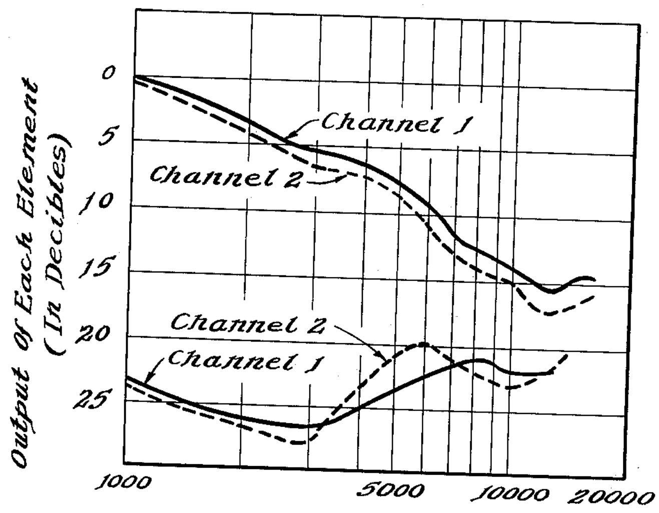
Figure 6:
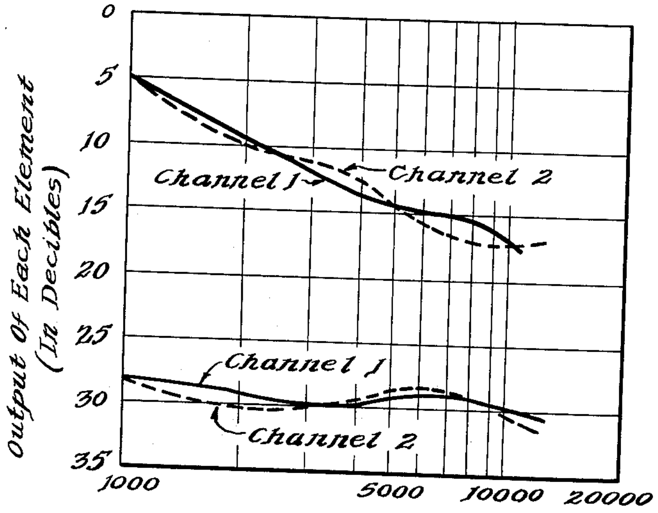

FIGURE 4 is a sectional view of the phonograph pickup taken along the line 4—4 of FIGURE 1; and FIGURES 5 and 6 are graphs illustrating the improvement in the isolation between channels of the phonograph pickup illustrated in FIGURES 1 through 4 over that of the prior art devices.

The phonograph pickup illustrated in the figures has a housing or casing 10 which is mounted on a bracket 12. The bracket 12 is adapted to be mounted to a conventional phonograph arm, which has not been illustrated.

The bracket 12 has two parallel spaced leg portions 16 and 18 and an interconnecting strip portion 20. The leg portion 18 is provided with a relatively large circular opening 22, and the housing 10 has a circular protruding end 24 which is journaled within the opening 22. The leg portion 16 has a circular bore 26 therein confronting the opening 22 of the leg portion 18, and the end of the housing 10 opposite the protruding end 24 is provided with an outwardly extending circular stem 28 which is journaled within the bore 26. In this manner, the housing 10 is rotatably mounted relative to the bracket 12.

The housing 10 is constructed of two mating parts 30 and 32 which are cemented together. An elongated rectangular cavity 34 is disposed within the housing 10 between the parts 30 and 32. One of the parts is provided with an outwardly extending arm 36 which facilitates rotation of the housing 10 relative to the bracket 12.

A resilient block 38 of electrically insulating material, such as rubber or vinyl plastic, is disposed in the cavity 34 adjacent to the protruding end 24. The block 38 is secured to the casing 10 and forms a resilient means for mounting one end of two elongated piezoelectric generating elements 40 and 42. One end of each of the generating elements is embedded in the block 38, and the transverse axes of the generating elements 40 and 42 are disposed normal to each other. Each of the generating elements 40 and 42 is preferably constructed of an artificial piezoelectric material, that is a material which obtains its piezoelectric properties as a result of being polarized by an electrical potential, although it is to be understood that the present invention may be practiced with elements having piezoelectric properties in their natural state. Particularly suitable artificial piezoelectric materials are barium titanate or strontium titanate with a ceramic binder, or lead zirconium titanate.

The generating elements 40 and 42 are provided with electrically conducting electrodes 44 and 46 on opposite surfaces, the electrodes being insulated from each other and extending the length of the generating elements 40 and 42.

The ends of the generating elements 40 and 42 opposite the resilient block 38 terminate between openings 48 and 50 in the parts 30 and 32 of the housing 10. The openings 48 and 50 are aligned with the axis of the cavity 34, and the generating elements 40 and 42 are disposed on a plane normal to the axis of the openings 48 and 50. A yoke 52 of electrically insulating compliant material, such as rubber or vinyl plastic, extends through the openings 48 and 50 and is secured to the end of both of the generating elements 40 and 42. As best illustrated in FIGURES 1 and 4, the ends of the generating elements 40 and 42 are embedded in conforming channels 54 extending through the yoke 52, and are secured therein, as by cement. An annular opening or passage 56 extends through the yoke 52 centrally between the generating elements 40 and 42, the passage 56 being disposed between the plane of the generating elements 40 and 42 and the opening 50 of the housing 10.

The housing 10 is provided with a pair of indentations 58 adjacent to the protruding end 24 of the housing and extending across the surfaces of the housing disposed normal to the plane of the generating elements 40 and 42. Two stylus holders 60 and 62 are mounted to the housing 10 by brackets 64 of spring metal. The brackets 64 have a flat portion 66 terminating in legs 67 at the ends thereof extending normally from the flat portion 66 and abutting the surface of the housing 10 within the indentations 58. The stylus holders 60 and 62 are thus seen to be clipped to the housing 10 and to be removable for replacing the stylus. Each of the stylus holders 60 and 62 has a rod 68 secured centrally to the flat portion 66 of the bracket 64 and terminating at its opposite end in a stylus 70. Each of the rods 68 has an obtuse angle adjacent to the stylus 70 to orient the stylus at the proper rake angle to the record surface. One of the styli has a diameter selected for records with wider grooves. Both parts 30 and 32 of the housing 10 are provided with longitudinal slots 71 confronting the rods 68 to avoid interference with motion of the rods.

The yoke 52 is provided with two grooves 72 and 74 which are located on a plane normal to the plane of the generating elements 40 and 42 and midway between the generating elements 40 and 42. The rod 68 of the stylus holder 60 is wedged within the groove 72, and the rod 68 of the stylus holder 62 is wedged within the groove 74. The rods 68 have restricted portions 76 adjacent to the brackets 64, and hence act as if pivotally connected to the brackets. As a result, movement of either one of the styli 70 is transmitted to the yoke 52, and hence to the generating elements 40 and 42.

Three electrical contacts 78, 80 and 82 extend through the protruding end 24 of the housing into the cavity 34. Each part 30 and 32 of the casing 10 is provided with a slot 84 for accommodating each of the contacts, and the slots in the confronting parts 30 and 32 of the housing 10 are aligned. The contacts 78, 80, and 82 have expanded end portions 86 within the cavity 34 to anchor the contacts to the housing.

FIGURES 2 and 3 illustrate the electrical connections between the contacts 78, 80, and 82 and the electrodes 44 and 46 of the generating elements 40 and 42. The electrode 46 of generating element 40 is connected to the electrode 44 of generating element 42, and these electrodes are connected to the center contact 80 which is the contact to be connected to a common ground conductor of two electroacoustical stereophonic channels. The electrode 44 of the generating element 40 is connected to the contact 82, and the electrode 46 of the generating element 42 is connected to the contact 78.

It is to be noted that the generating elements 40 and 42 are electrically polarized so that the elements produce an electrical response to bending, as is well known in the art. The elements are also polarized oppositely, that is, polarization vectors extend in opposite directions relative to a conducting surface between the electrodes of each of the elements 40 and 42. Therefore, a vertical deflection of the elements generates a positive or negative charge on the contact 80 and an opposite charge on the contacts 78 and 82.

When reproducing records with relatively narrow grooves, such as stereophonic records, the stylus holder tends to resonate. As a result of resonance, a sharp dip will occur in the frequency response curve of the pickup at the resonant frequency, usually around 5 kilocycles. For this reason, a compliant snubber 90 is secured to the housing 10 abutting the rod 68 of the stylus holder 62. No snubber is required for wider groove records even though the response is greater because there is little response at the frequencies resonance is apt to occur and the restricted portion 76 of the stylus holder 60 may be made less compliant.

The pickup here disclosed is designed to respond to both lateral undulations of conventional records and stereophonic records which employ channels pressed at 45 degree angles relative to the record surface. The stylus 70 of the stylus holder 62 is employed for the narrower or microgroove records including stereophonic records, and the stylus of the holder 60 is used for wider groove records. However, since the output of records with wider grooves exceeds that of a microgroove record, it is desirable to reduce the response of the pickup to the wider groove records. The passage or opening 56 in the compliant yoke 52 is disposed between the rod 68 and the generating elements 40 and 42 for the purposes of reducing coupling between the stylus holder 60 and the generating elements, and to reduce the coupling between the generating elements 40 and 42. The passage 56 extends between the elements 40 and 42 to reduce the coupling therebetween.

In one particular construction of a phonograph pickup according to the present invention, the generating elements 40 and 42 are disposed at a distance between axes of 0.130 inch, and the passage 56 has a diameter of 0.078 inch. The yoke 52 is constructed of rubber and has a thickness tapering from 0.040 at the slots 72 and 74 to 0.060 in the plane of the generating elements. The yoke has a width in the plane of the generating elements of 0.185 and a length normal thereto of 0.24 inch. The generating elements are constructed of lead zirconium titanate and have a length of seven-sixteenths inch, width of 0.062 inch, and thickness of 0.026 inch.

As illustrated in FIGURES 1 and 3, a member 92 is mounted between the elements 40 and 42 and abuts each of these elements at a point approximately midway between the yoke 52 and the resilient block 38. The member 92 is in the form of a bar with a rectangular cross-section and ends 94 shaped to fit the contours of the elements 40 and 42. Since the elements 40 and 42 are essentially rectangular in cross-section, the ends 94 of the member 92 have generally rectangular notches, and the ends 94 are secured to the elements 40 and 42. A layer 96 of cement suitably performs this function.

The member 92 may be constructed of noncompliant material but is preferably constructed of resilient material and material which has high damping properties. The inventor has found resilient material is preferable for the member 92 in order to prevent undue coupling between the elements which would reduce the isolation between channels. Polyvinyl chloride having a durometer reading from 20 to 90 has proven to be particularly satisfactory for the member 92, and in one construction a polyvinyl member 92 with a durometer reading of 50 having dimensions of .050 x .054 in cross-section and a length at its shortest points of 0.090 inch has proven very satisfactory. Another suitable material has been found to be rubber. Hardness readings in the rubber and plastics industries are conventionally made in terms of the scale employed by Shore Instrument and Manufacturing Company, Incorporated of Jamaica, New York, and these readings are designated in terms of "durometer."

The phonograph pickup described above is identical to that described in the above referred to patent application of Howard M. Durbin and the present inventor, except that the damping member 92 has been added between the elements 40 and 42. FIGURE 5 illustrates the isolation achieved between channels of such a phonograph pickup without the damping member 92. The isolation, that is the ratio of the response of the element having an axis between electrodes normal to the axis of the impressed force relative to the response of the element having an axis aligned with the axis of the impressed force, at 5000 cycles per second is approximately 12 decibels. FIGURE 6 illustrates the same phonograph pickup with the described 50 durometer polyvinyl damping bar 92 mounted between the elements 40 and 42, and it is to be noted that the isolation between channels at 5000 cycles has been improved to 16 decibels for the poorest channel. Further, this increase in isolation has been achieved without the loss of compliance for the pickup, the overall lateral compliance of the pickup being $1.5\times10^{-6}$ centimeters per dyne in both cases. Further, the channel isolation at 10,000 cycles for the poorest channel in FIGURE 5 is only 7 decibels, while the poorest channel insolation at this frequency in FIGURE 6 is 12 decibels. The reason for the decrease in isolation between channels at two frequencies, as illustrated in FIGURES 5 and 6, is because of the fact that the resonant frequency of the two elements 40 and 42 is different.

From the foregoing disclosure, those skilled in the art will readily devise modifications and embodiments of the present invention within the scope of this invention. It is therefore intended that the scope of the invention be not limited by the foregoing disclosure, but rather only by the appended claims.

The invention claimed is:

1. A stereophonic phonograph pickup comprising a pair of piezoelectric elements having elongated bodies and electrodes disposed on opposite surfaces thereof, means, attached to one end of each element for mounting the elements in parallel spaced relationship with the axis extending between the electrodes of one element disposed normal to the axis extending between the electrodes of the other element, means for coupling a stylus to the end of each element opposite the mounting means including a yoke extending between the element, and a compliant member mounted to the elements, said member contacting each of the elements between the mounting means and the opposite end of the elements and being totally supported by the elements.

2. A stereophonic phonograph pickup comprising a pair of piezoelectric elements having elongated bodies and electrodes disposed on opposite surfaces thereof, means for mounting the elements at one end in parallel spaced relationship with the axis between the electrodes of one element disposed normal to the axis between the electrodes of the other element, a yoke constructed of resilient material secured to each of the elements at the end thereof opposite the mounting means, a stylus coupled to the yoke, and a compliant member abutting each of the elements between the yoke and the mounting means and extending between the elements.

3. A stereophonic phonograph pickup comprising a pair of piezoelectric elements having elongated bodies and electrodes disposed on opposite surfaces thereof, means attached to one end of each element for mounting the elements at one end in parallel spaced relationship with the axis between the electrodes of one element disposed normal to the axis between the electrodes of the other element, a yoke constructed of resilient material secured to each of the elements at the end thereof opposite the mounting means, a stylus coupled to the yoke, and a resilient elongated bar of material having at least the compliance of 50 durometer polyvinyl chloride abutting each of the elements between the yoke and the mounting means and extending between the elements.

4. A turnover stereophonic phonograph pickup comprising a housing having an elongated cavity therein and openings into one end of the cavity in opposite walls, a block of resilient material mounted to the housing within the cavity and spaced from the openings, a pair of piezoelectric elements having elongated bodies with rectangular cross-sections and electrodes disposed on the surfaces of the bodies parallel to the transverse axes thereof, said elements being mounted at one end to the block of resilient material and disposed parallel to each other with the axes between the electrodes thereof being normal to each other and intersecting in the plane equidistant from the elements, a yoke constructed of resilient material secured to the end of each of the elements opposite the block and extending through each of the openings to the exterior of the housing, said yoke having grooves exterior to the housing confronting each opening in the plane equidistant from the elements, a pair of stylus holders having a spring clip at one end wedged about the housing and a rod extending from the clip, the rod of one of the holders being wedged within each of the grooves of the yoke, a stylus secured to the end of each stylus holder opposite the clip, and a compliant bar of 50 durometer polyvinyl chloride abutting each of the elements approximately midway between the yoke and block of resilient material, said bar having ends conforming to the elements and each end of the bar being secured to the adjacent element.

5. A stereophonic phonograph pickup comprising a pair of piezoelectric elements having elongated bodies and electrodes disposed on opposite surfaces thereof, means attached to one end of each element for mounting the elements at one end in parallel spaced relationship with the axis between the electrodes of one element disposed normal to the axis between the electrodes of the other element, a yoke constructed of resilient material secured to each of the elements at the end thereof opposite the mounting means, a stylus coupled to the yoke, and a resilient elongated bar of polyvinyl chloride having a durometer from 20 to 90 abutting each of the elements between the yoke and the mounting means and extending between the elements.

6. A stereophonic phonograph pickup comprising a pair of piezoelectric elements having elongated bodies and electrodes disposed on opposite surfaces thereof, means attached to one end of each element, for mounting the elements at one end in parallel spaced relationship with the axis between the electrodes of one element disposed normal to the axis between the electrodes of the other element, means for coupling a stylus to the ends of the elements opposite the mounting means, including a yoke mounted on the elements, and a compliant member mounted on the elements, said member contacting each of the elements between the mounting means and the opposite end of the elements and being totally supported by the elements.

References Cited in the file of this patent

UNITED STATES PATENTS 2,955,170 Dieter ---------------- Oct. 4, 1960

FOREIGN PATENTS 775,987 Great Britain ---------- May 29, 1957